United States Patent
Hegde et al.

(12) 
(10) Patent No.: US 6,447,839 B1
(45) Date of Patent: Sep. 10, 2002

(54) METHOD OF DEPOSITING MULTILAYER THIN FILMS

(75) Inventors: Hari Hegde, Flushing; Adrian Devasahayam, Woodmere; Jinsong Wang, Port Jefferson Station, all of NY (US)

(73) Assignee: Veeco Instruments, Inc., Plainview, NY (US)

(*) Notice: Subject to any disclaimer, the term of this patent is extended or adjusted under 35 U.S.C. 154(b) by 0 days.

(21) Appl. No.: 09/603,408

(22) Filed: Jun. 26, 2000

Related U.S. Application Data

(62) Division of application No. 09/414,233, filed on Oct. 7, 1999, now Pat. No. 6,139,906.
(51) Int. Cl.$^7$ .............................. B05D 5/12; G11B 5/127
(52) U.S. Cl. ................... 427/125; 427/126.3; 427/131; 427/132; 29/603.01; 29/603.13; 29/603.14
(58) Field of Search .................... 29/603.01, 603.13, 29/603.14; 427/125, 126.3, 127, 131, 132, 282; 360/313, 324

(56) References Cited

U.S. PATENT DOCUMENTS

| | | | |
|---|---|---|---|
| 5,018,037 A | | 5/1991 | Krounbi et al. |
| 5,438,470 A | | 8/1995 | Ravipati et al. |
| 5,492,605 A | | 2/1996 | Pinarbasi |
| 5,664,316 A | | 9/1997 | Chen et al. |
| 5,867,889 A | * | 2/1999 | Dovek et al. ............ 29/603.13 |
| 5,985,162 A | * | 11/1999 | Han et al. ..................... 216/22 |
| 6,030,753 A | * | 2/2000 | Lin ............................ 430/314 |

* cited by examiner

Primary Examiner—Brian K. Talbot
(74) Attorney, Agent, or Firm—Morgan & Finnegan, LLP

(57) ABSTRACT

This invention is directed to methods for depositing multi-layered thin films onto substrates, for example in making thin film magnetic heads. In accordance with the invention a first film, such as Cr, is deposited onto the substrate at a first pressure and a second layer, such as CoCrPt is deposited at a second pressure.

9 Claims, 7 Drawing Sheets

METHOD OF DEPOSITING MULTILAYER THIN FILMS

This is a divisional of application Ser. No. 09/414,233 filed Oct. 7, 1999 now U.S. Pat. No. 6,139,906.

BACKGROUND OF THE INVENTION

The subject invention relates to improved multilayered products and methods for manufacturing such products. More particularly, the subject invention relates to improved semiconductor products such as thin film read/write heads and methods for manufacturing such heads.

Underlayers play an important role in the formation of appropriate crystallographic textures of overlaid films in many applications. Typically, an underlayer is chosen such that the plane of atoms at the interface between layers provides an appropriate template to encourage growth of the overlaid film in a desired texture. Thus, the underlayer itself has to be grown in the correct texture and must have the correct lattice dimensions to promote this epitaxy.

Examples of a multilayer system contemplated here are the Cr/CoCrPt systems used in making thin film permanent magnets and Cr/Ta systems used for making electrical lead material. These permanent magnets and leads are important elements of thin film magnetic recording heads which are used in data storage devices like computer hard drives. A typical permanent magnet for such application may have a Cr underlayer having a thickness of about 20 angstroms to about 100 angstroms and a CoCrPt overlayer having a thickness of about 100 angstroms to about 1000 angstroms.

As requirements for greater storage density increase, there is a great need-to be able to make ultra sensitive heads which, while having enhanced properties, can be made reliably with reasonable manufacturing expense.

SUMMARY OF THE INVENTION

In accordance with the invention, there is provided a method for depositing multilayer films. The method includes the step of providing a substrate that defines a normal incident deposition angle that is perpendicular to the face of the substrate. A first film is deposited onto the substrate at a first deposition angle. A second film is deposited onto the substrate at a second deposition angle. In one embodiment of the invention, the first film may comprise Cr which is deposited at an angle greater than about 15° from the normal incident deposition angle, preferably greater than about 20° from the normal, and most preferably in the range of about 20–60° from the normal. The second film may comprise CoCrPt or Ta which is deposited at a second deposition angle that deviates less from the normal than does the first deposition angle.

In accordance with another aspect of the invention, there is provided a method for depositing multilayer films, for example as part of a process for making a thin film magnetic recording head, comprising the steps of: providing a substrate which defines a normal angle of deposition incidence; depositing a layer of permanent magnet material at a first deposition angle relative to the normal angle; and depositing a layer of electrical lead material onto the substrate at a deposition angle relative to the normal angle that is greater than the first deposition angle.

In accordance with a further aspect of the invention, there is provided a method for depositing multilayer films onto a substrate to form improved permanent magnets used in making thin film magnetic recording heads. The method comprises the steps of providing a substrate which defines a normal angle of deposition incidence; depositing a first layer of material, such as Cr, onto the substrate at a first deposition angle relative to the normal angle, and depositing onto the substrate a second layer of material, such as CoCrPt, at a second deposition angle relative to the normal, the first deposition angle being greater than the second deposition angle.

The above and other aspects of the invention will be described in more detail below.

DETAILED DESCRIPTION OF THE PREFERRED INVENTION

A general aspect of the subject invention relates to methods for depositing multilayer films such that underlayer lattice size is carefully controlled to provide products having enhanced performance characteristics.

One application of the invention relates to the deposition of a Cr underlayer and a CoCrPt overlayer in forming thin film permanent magnets used in thin film magnetic recording heads. CoPt can be substituted for CoCrPt. These magnets have a structure of the type Cr-X A°/CoCrPt—Y A°, wherein X and Y are Cr and CoCrPt thicknesses which can vary, but are typically: 20 angstroms $\leq X \leq 100$ angstroms and 100 angstroms $\leq Y \leq 1000$ angstroms. The electrical leads of the recording head can be made of various materials, one of which is the alpha phase of Ta This alpha Ta can be obtained by depositing Ta on a thin underlayer of Cr. In a typical electrical lead bilayer, the Cr underlayer may be about 20 angstroms thick. The Ta overlayer may be about 1000 angstroms thick.

Figure 1:
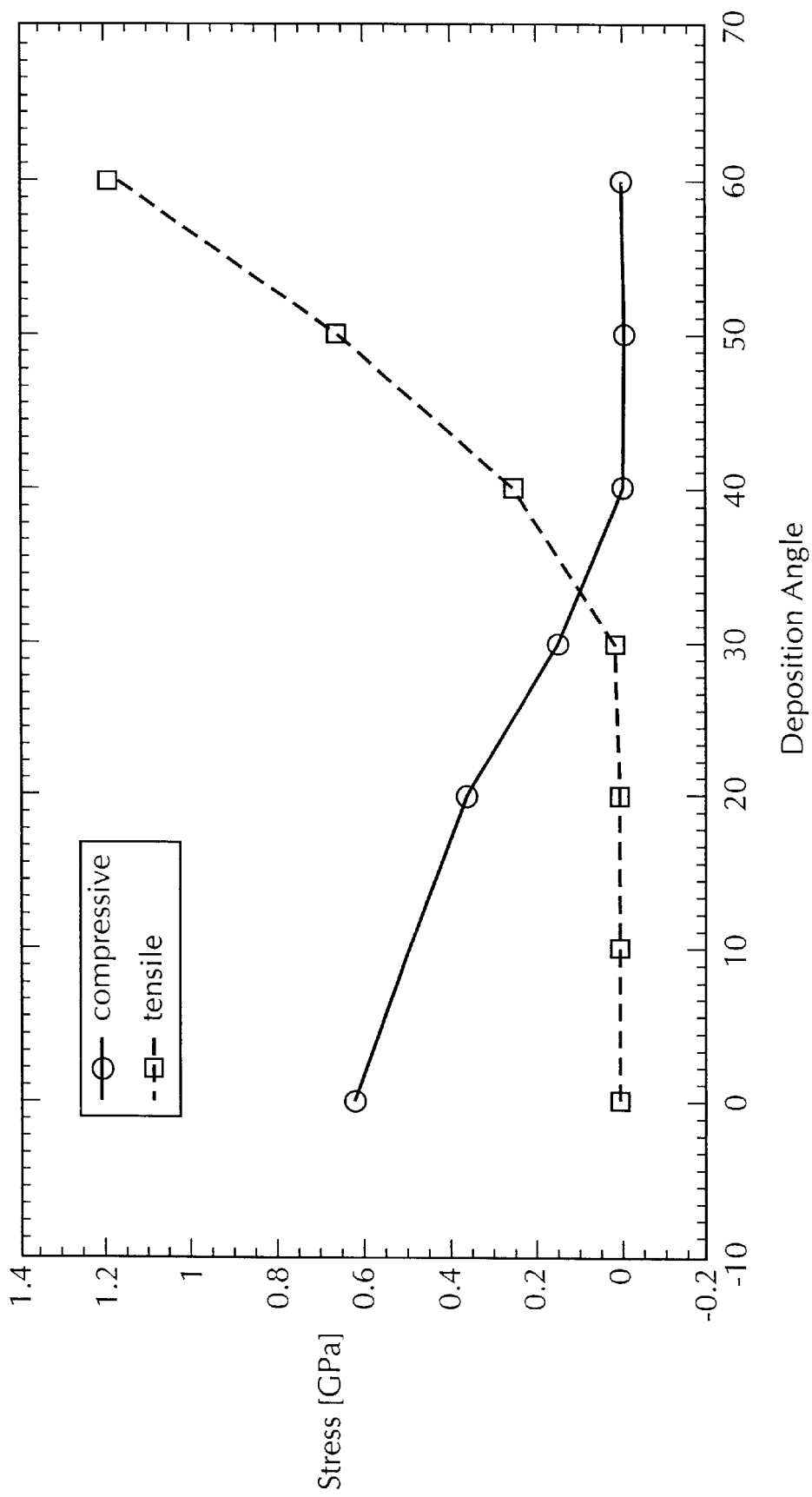
FIG. 1 is a graph plotting stress as a function of film deposition angle (relative to normal angle of incidence).

In accordance with the invention, it has been found that the stress of Cr films can be altered by changing the deposiTorr angle of the Cr. FIG. 1 is a graph that plots Cr stress as a function of deposition angle, with deposition angle being measured as the deviation from the substrate normal (0° deposition angle=90° to the plane of the substrate). As shown in FIG. 1 compressive stresses decrease as deposition angle increases.

Figure 2:
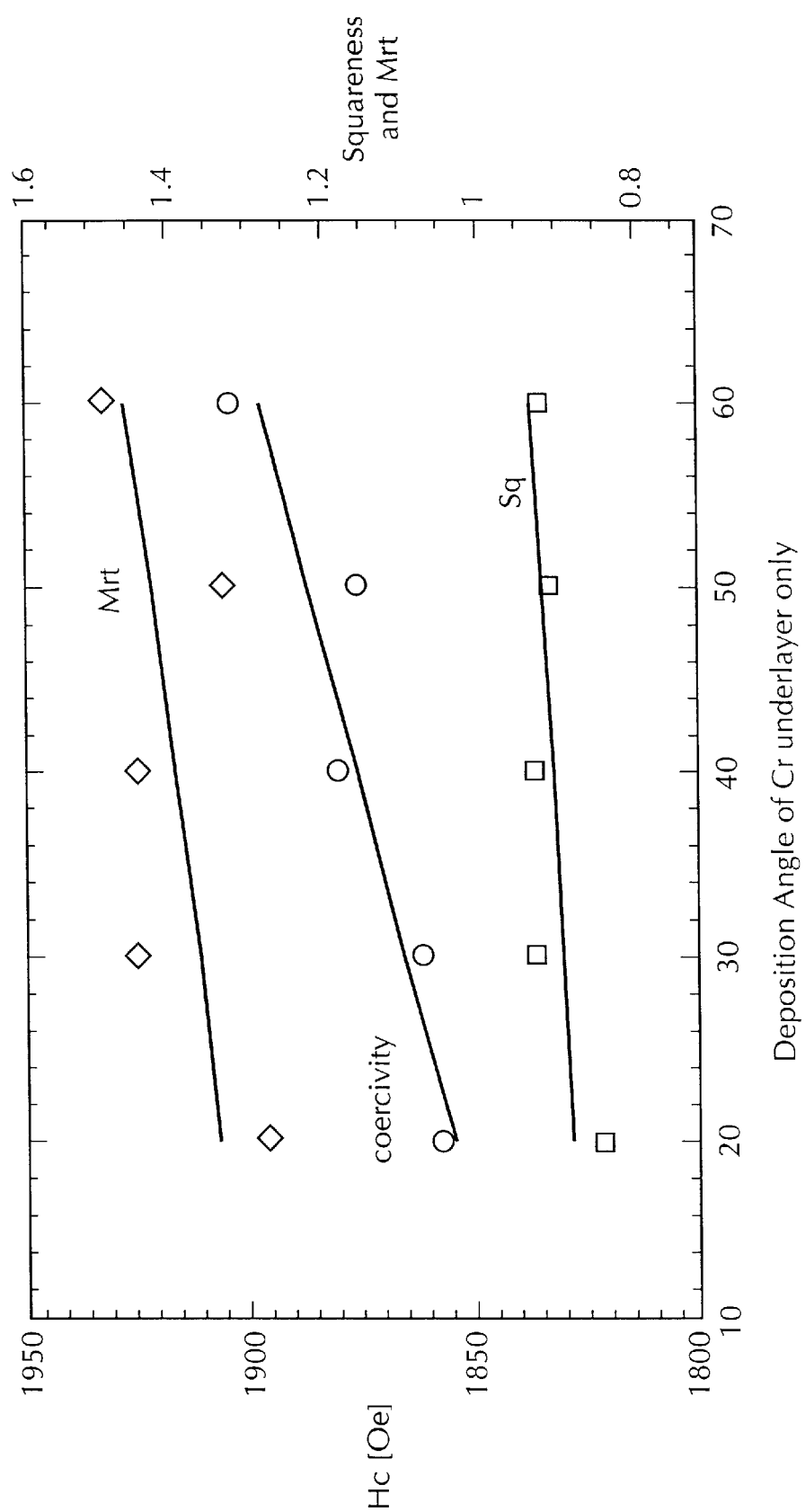
FIG. 2 is a graph plotting coercivity, Mrt and squareness as a function of deposition angle of Cr underlayer of a permanent magnet bilayer.

It has also been bound that when CoCrPt is deposited over a film of Cr with the Cr and CoCrPt being deposited at different angles, the magnetic properties of the CoCrPt layer are altered. FIG. 2 is a graph that shows that depositing the Cr underlayer at large angles, i.e. about 20° to 60° from normal, enhances the coercivity. The Squareness and Mrt improve to a lesser degree. X-ray diffraction scans for these films showed that depositing the Cr underlayer at large angles enhanced the in-plane texture of the CoCrPt layer deposited on top of it. Thus, depositing the chromium at a large angle (about 20° to 60° from normal) resulted in improved magnetic results because of great in-plane texturing of the CoCrPt layer deposited on top of it.

Figure 3:
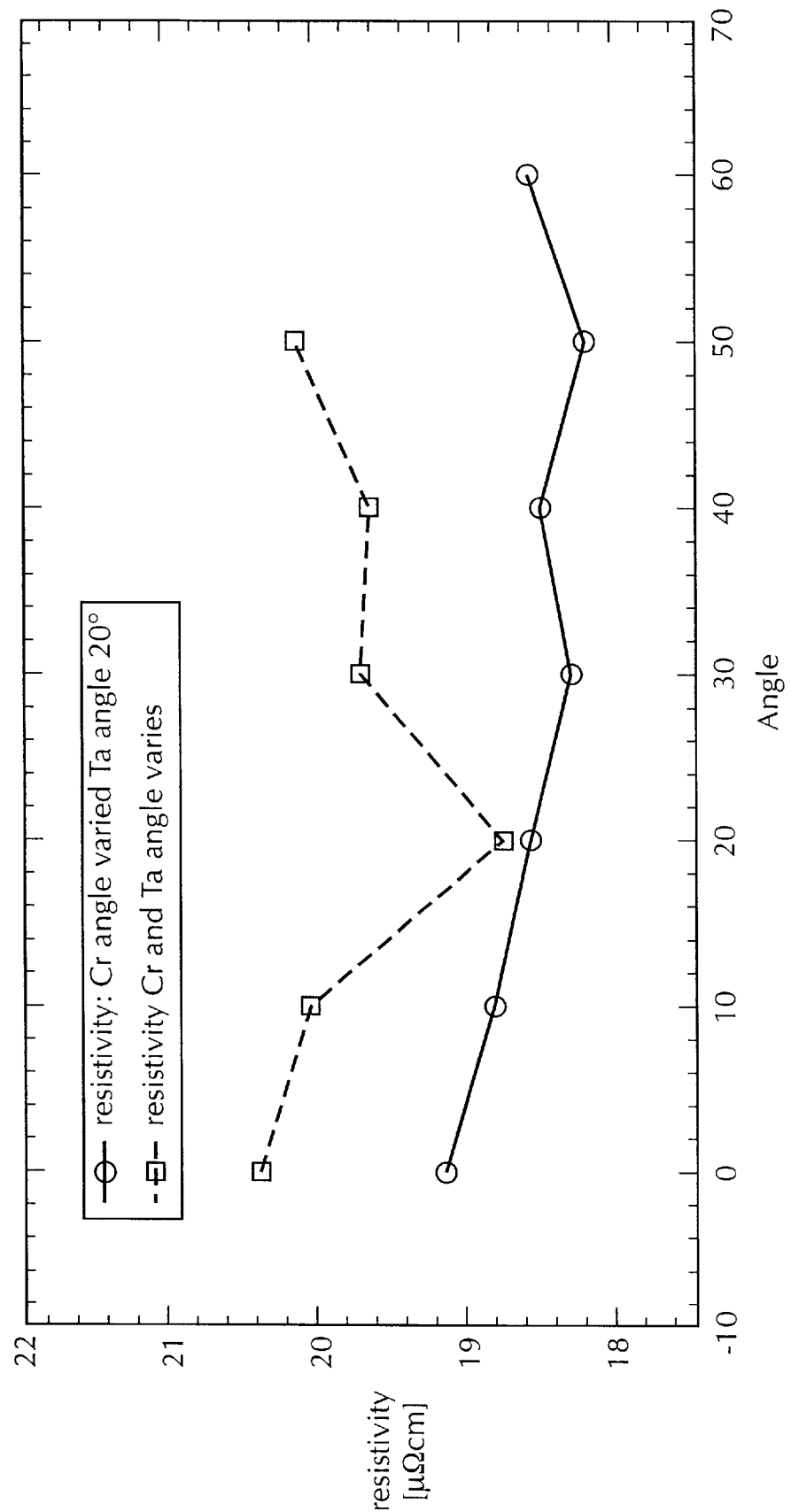
FIG. 3 is a graph plotting resisitivity of Cr/Ta films as a function of Cr deposition angle.

As with the Cr/CoCrPt layers described above, it has been found that the Cr/Ta material system can be optimized by varying the deposition angle of the Cr underlayer. For example, the resistivity of the alpha-Ta phase of Ta can be reduced to about 18.25 $\mu\Omega$cm by varying the Cr deposition angle. FIG. 3 is a graph showing that the resistivity of a CrTa system decreases as the Cr deposition angle (deviation from normal) increases. The Ta was deposited in each instance at 20° (from normal).

From the above, it can be seen that depositing an underlayer of Cr at a different angle from the overlaid film results in:

1. The coercivity of Cr/CoCrPt films can be enhanced;
2. The resistivity of Cr/Ta films can be decreased.

Both these enhancements are brought about by better epitaxial matching of the Cr underlayer with the overlaid film.

It should be noted that in addition to the above specified underlayers and overlayers, it is contemplated that the subject dual deposition angle technique provides better lattice matching and attendant enhanced characteristics with other underlayers such as TiW and any lattice matched film that overlays the underlayer.

Figure 4:
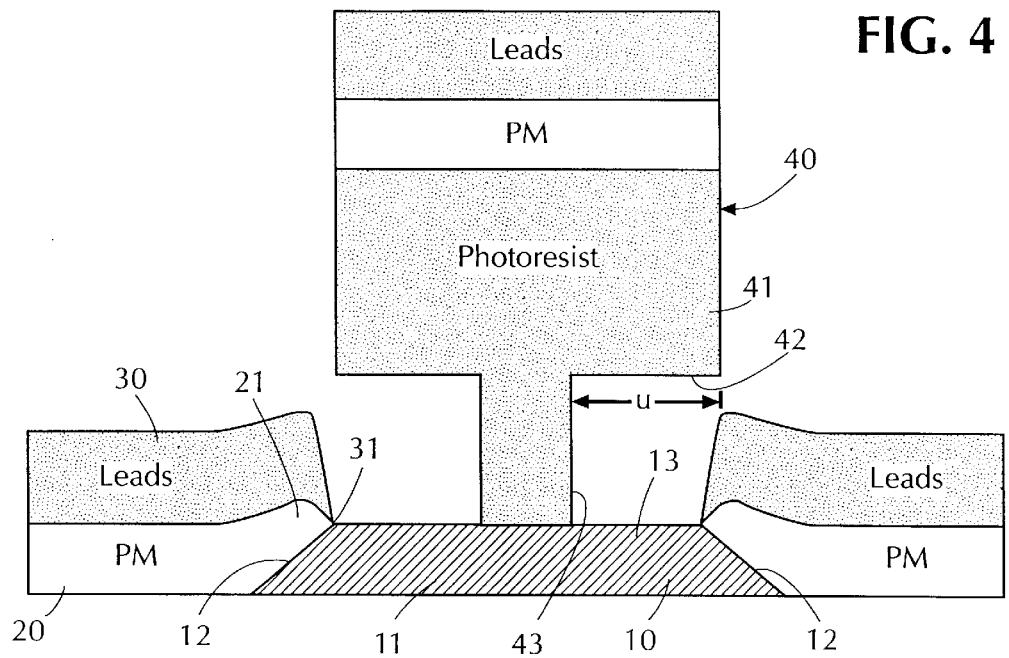
FIG. 4 is a schematic diagram showing a recording head during fabrication according to the prior art.

Varying the deposition angle of multilayered films also allows for further optimization of the abutted permanent magnet junction in thin film magnetic recording heads. Referring to FIG. 4, there is illustrated a schematic diagram of a read sensor during fabrication of the abutted junction with the permanent magnet layer and the electrical lead underlayer having been deposited at the same angle, namely normal to the substrate or substantially normal to the substrate e.g. less than about 25° from the normal.

As shown, sensor material 10 has been deposited, a photoresist material 14 has been patterned onto the sensor material 10, and the sensor material has been etched so that it has a base position 11, sloped sidewalls 12 and a contact surface 13. Photoresist material 40 has a body portion 41 an undercut portion 42 having a length U and a base 43 having a height $h_2$. As is also shown in FIG. 4, a permanent magnet material 20 (e.g. Cr/CoCrPt) has been deposited onto sensor material 10 followed by a layer of electrical lead material 30.

Because of the configuration of the photoresist material and the angle of deposition of the permanent magnet and electrical lead materials, the layer of electrical lead material 30 terminates in a sharp point 31 on top of permanent magnet layer 20 so as to provide a very small contact area with the sensor 10. This can result in undesirably large contact resistances as well as poor track width definition (the area between the leads) because of the unpredictability of the termination point of the lead. As is further illustrated in FIG. 4, the permanent magnet layer 20 tapers at end portion 21 as it extends over sloped portion 12 of sensor 10. This tapering can lead to degradation of magnetic properties as the permanent magnet layer 20 gets thinner.

Figure 5:
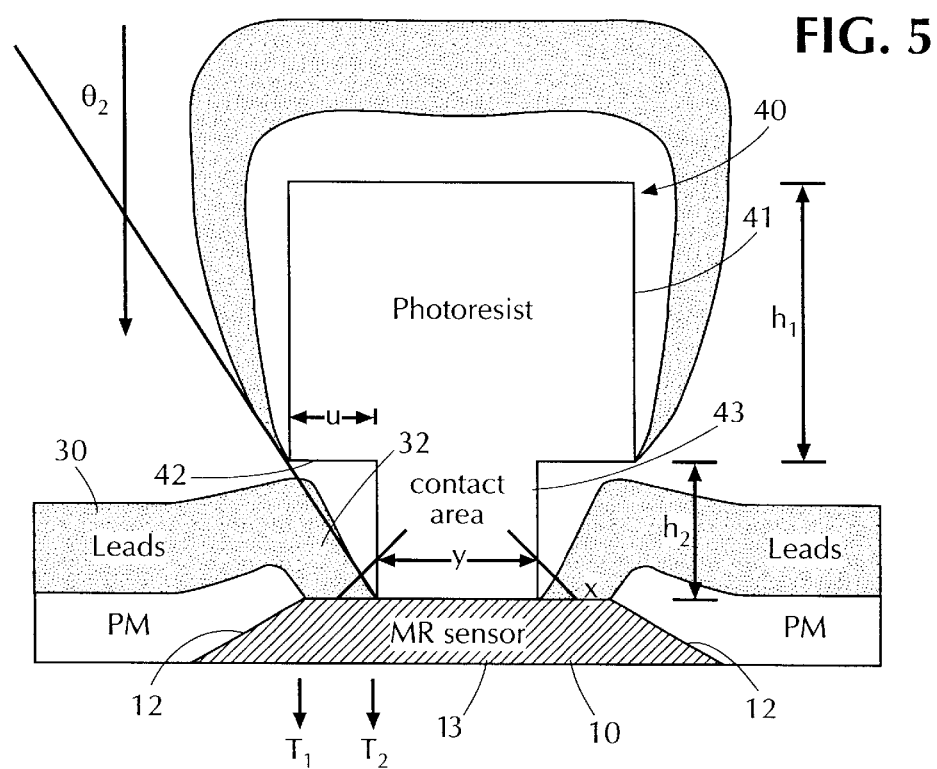
FIG. 5 is a schematic diagram showing a recording head during fabrication in accordance with the invention.

Referring now to FIG. 5, there is illustrated a schematic diagram showing the product of deposition in accordance with the subject invention. Specifically, FIG. 5 illustrates the product configuration resulting from depositing the permanent magnet layer 20 at the conventional angle Ø, i.e., normal or substantially normal (typically within 25° of normal) and depositing the lead material layer 30 at an angle $Ø_2$ larger than that used in the permanent magnet layer deposition, such as at about 50° from normal. In accordance with a preferred embodiment of the invention, the deposition is effected by ion beam deposition which enables deposition angle to be selectively varied.

As shown in FIG. 5, the dual deposition angle scheme of the subject invention results in lead material end portion 32 having two termination points $T_1$ and $T_2$ that define a contact area X between lead material 30 and sensor 10. Because the deposition angle of the lead material $Ø_2$ is greater than the deposition angle of the hard bias permanent magnet material (e.g. Cr/CoCrPt), $T_2$ is farther under the photoresist structure 14 than $T_1$. Thus, by depositing the lead layer 30 at a larger angle than the permanent magnet layer 26, the lead material encroaches over the permanent magnet material 20 and onto sensor 10. This allows electrical current to flow directly to the sensor 10 and thereby reduce contact resistance. In addition, there is better track width control of the final device as the lead overlap onto sensor 10 is more predictable. Depending on the dimensions of the photoresist structure 40 and the deposition angles, the contact area 31 can be tailored according to the application and process.

As shown in FIG. 5, the photoresist material 40 is configured to have a body portion 41 having a height $h_1$, an undercut portion 42 having a length u, and a base portion 43 having a height $h_2$ between body portion 41 and contact surface 13 of sensor 10. The distance Y between the leading termination points $T_2$ of leads 30 define track width. Typical values of $h_1$, $h_2$, u and x vary from process to process. Assuming that the undercut u>x, the following relationship can be used to calculate the various parameters:

$$x=h_2[\tan(Ø_2)-\tan(Ø_1)] \quad \text{Eq. 1}$$

where Ø1 and Ø2 are the deposition angles of the PM and Leads respectively. For the contact area x to be greater than zero, Ø2 must be greater than Ø1.

In accordance with the subject invention, it is also contemplated that the subject dual deposition angle approach be employed with respect to exchange bias materials as well as the hard biasing material (Cr/CoCrPt) discussed above. More particularly, it is contemplated that the dual deposition angle process of the subject invention can be used to deposit the lead material over exchange bias material such as FeMn, IrMn, PtMn, NiMn, NiO, CoNiO or any other exchange biasing layer. By depositing the lead material at a deposition angle greater than the deposition angle at which the exchange biasing material is deposited (deposition angle being measured as deviation from normal to the substrate), a greater contact area between the lead material and sensor material can be achieved as shown in FIG. 5 with the exchange bias material being substituted for the hard bias permanent magnet material.

It should be noted that in addition to improving the electrical properties of the subject device by depositing the lead layer at a larger angle than the layer below it, the resulting topography as shown in FIG. 5 is smoother than if a single angle deposition process is used (See FIG. 4). An important implication of this is that any layer deposited on top will be smoother. In magnetic head fabrication, after the formation of permanent magnet and leads, an electrically insulating material is deposited, followed by a conductive shield. It is important that the insulating layer does not break down and allow current to flow from the leads into the shields. A rough topography is harder to completely isolate due to step-coverage issues. Thus, a smooth topography is desirable for good insulation.

Another method of improving the contact area between the lead material and sensor layer that is contemplated by the invention comprises depositing the lead material at a pressure that is higher than that usually used. Specifically, it is usual for the step of depositing the lead materials to be conducted at a pressure in the range of about $7\times10^{-5}$ to $1\times10^{-7}$ Torr. Indeed, it is common practice to try to have such deposition pressure as low as possible. It has been found, however, that using deposition pressures greater than $1\times10^{-4}$ Torr, such as from $1.5\times10^{-4}$ to about $3\times10^{-4}$ Torr or higher results in some of the lead material to encroach over the hard bias permanent magnet material and make good contact with the sensor layer. Reference is again made to FIG. 5 to illustrate this concept. As the pressure at which the lead material 30 is deposited is increased, there is a resulting greater gas-phase scattering of the deposition beam and attendant less directional deposition. Thus, referring to FIG. 5, the lead material will tend to be deposited below undercut portion 42 of photoresist 40 to form a good contact area X with sensor 10. At lower pressures, the lead material would be more directionally deposited and, unless the dual angle deposition process discussed above was used, typically be limited by the photoresist undercut portion 42 to basically, a point contact area with the sensor as shown in FIG. 4. In accordance with the invention, the process pressure can be increased to a desired level in the ion deposition tool by adding extra gas through the deposition source or assist source or plasma bridge neutralizer gas channels.

In accordance with the invention it is also contemplated that the lead bias permanent magnet material be deposited at a first pressure with the lead material being deposited at a second pressure greater than the first pressure.

Figure 6:
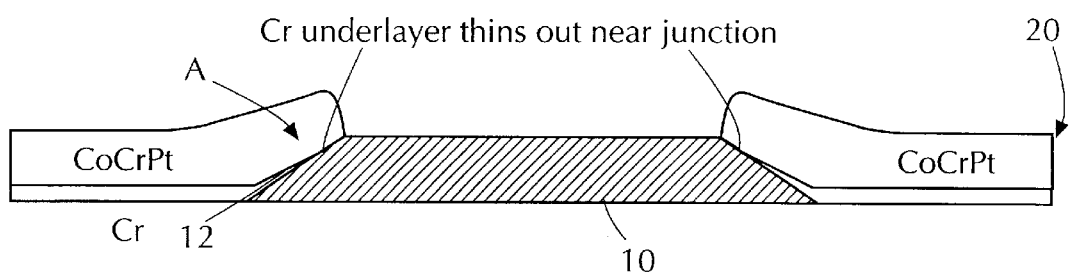
FIG. 6 is a schematic diagram showing the results of bilayer deposition over a sensor with the component portions of the bilayer being deposited at the same angle.
Figure 8:
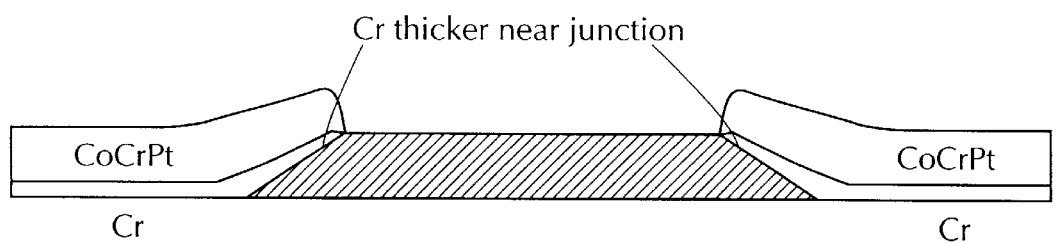
FIG. 8 is a schematic diagram showing the results of bilayer deposition over a sensor with the component portions of the bilayer being deposited at different angles in accordance with the invention.
Figure 7:
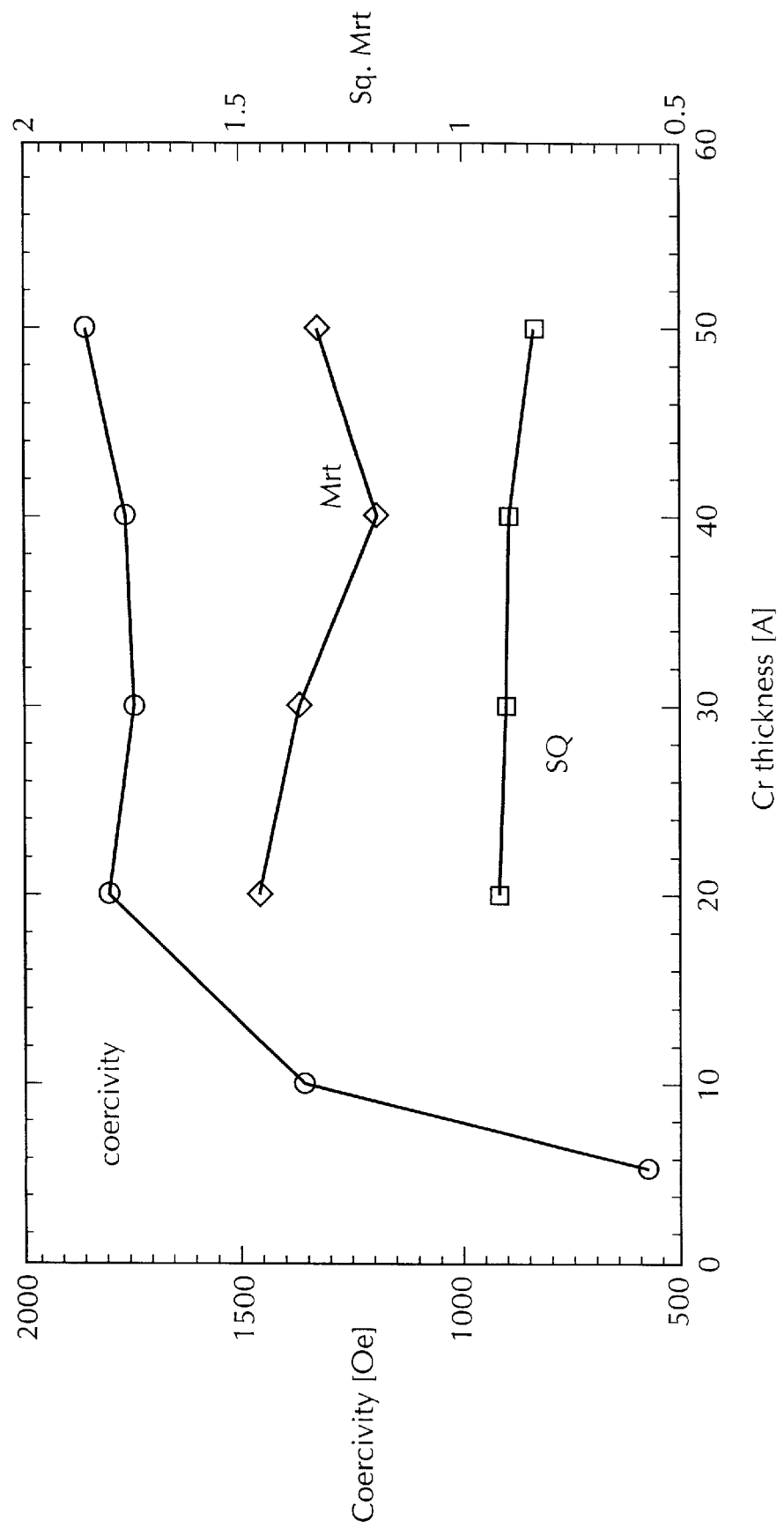
FIG. 7 is a graph plotting magnetic properties as a function of Cr underlayer thickness.

FIG. 6 is a schematic diagram showing the deposition configuration resulting from depositing two layers of material at substantially the same deposition angle. More specifically, FIG. 6 illustrates the deposition of a bilayer of material onto a sensor 10, the bilayer comprising an underlayer of $C_r$ and an overlayer of CoCrPt with the Cr having been deposited at substantially the same angle as CoCrPt, that angle being substantially normal (less than about 20° deviation from normal) to the sensor. As shown, the Cr underlayer becomes thin in the region A near the top or leading portion of sloping wall 12 of sensor 10. It has been found that as the Cr underlayer gets thinner the magnetic properties of the Cr/CoCrPt bilayer used to form the permanent magnet portion of the device (e.g. recording head) degrade. Specifically, it has been found that the resulting permanent magnet exhibits poor performance when the Cr underlayer is less than about 20 angstroms in thickness. In addition to lower coercivity, it has been found that Mrt and squareness of the films are also degraded. This is reflected in the graph of FIG. 7 which plots coercivity, Mrt and squareness as a function of Cr underlayer thickness. It is believed that the reason for the poor properties is that as the Cr underlayer gets thinner it fails to provide the appropriate expitaxial template for the CoCrPt overlayer. By depositing the Cr underlayer at a larger angle (farther from normal) than the CoCrPt, the Cr layer can be made thicker farther into the abutted junction than otherwise would occur. This is shown in FIG. 8. In accordance with the dual deposition scheme of the subject invention, the magnetic properties of the Cr/CoCrPt bilayer remain acceptable farther into the abutted junction than if the dual deposition scheme were not employed.

In accordance with the invention, ion beam deposition can be used to effectively control the stress level in underlayer films like chromium by careful choice of the deposition angle. With the appropriate angle chosen, the stress induced lattice dimension variation can be taken advantage of in expitaxial structures. In the case of Cr/CoCrPt and Cr/Ta, this type of manipulation of expitaxial matching can result in improved magnetic properties in the former and reduced film resistivities in the latter. These advantages are of greater significance to thin film recording heads.

Ion beam deposition angle also can be used to great advantage for device optimization. As shown above, a dual angle deposition scheme yields significant advantages over a single angle process. By depositing the Cr underlayer at a larger angle from the normal than the CoCrPt layer, the onset of degraded magnetic properties can be delayed. This choice of deposition angles also results in superior magnetic properties as described above.

Figure 9:
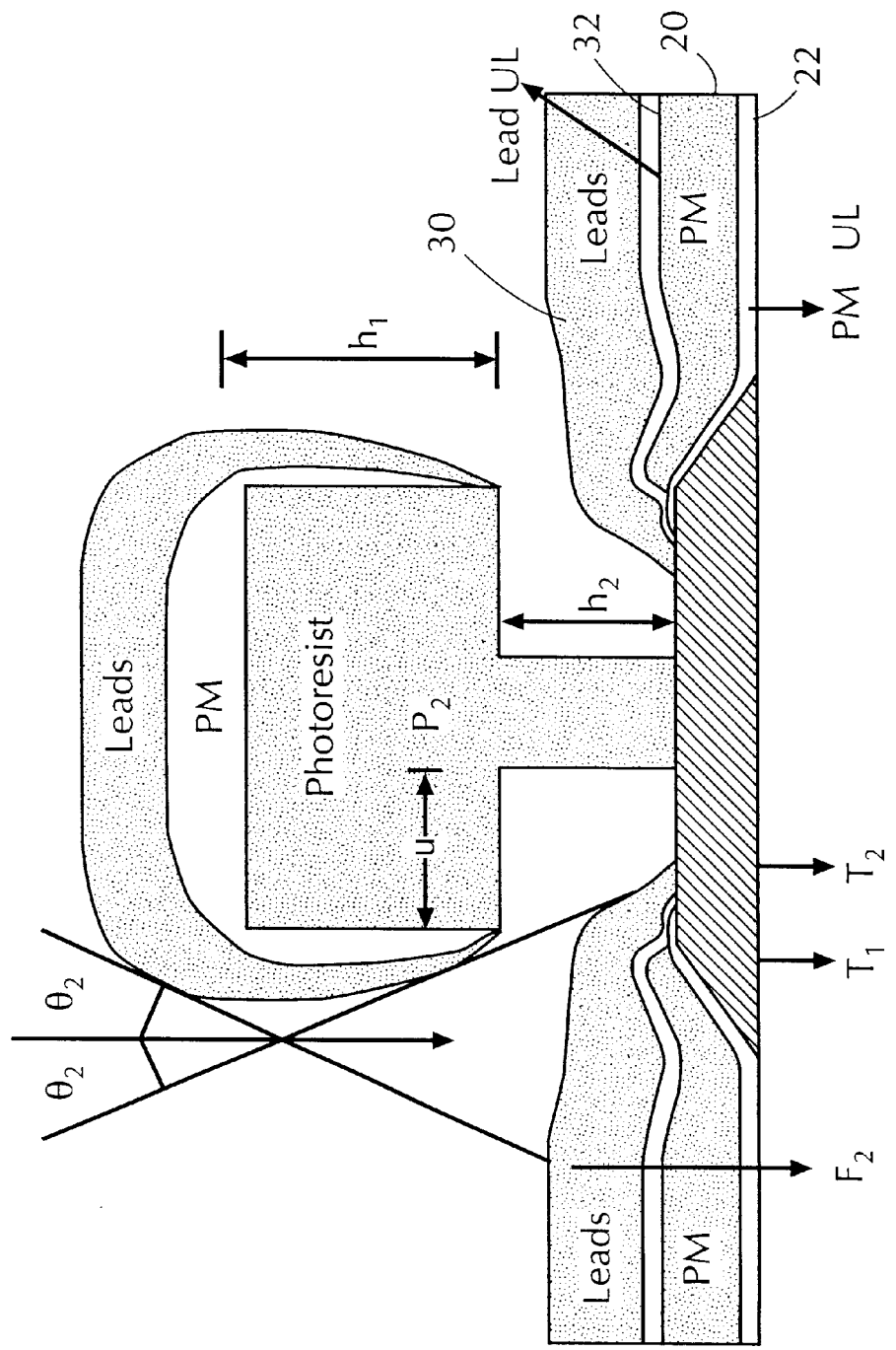
FIG. 9 is a schematic diagram showing the results of depositing bilayer leads and bilayer permanent magnets during fabrication of a recording head in accordance with the invention.

Another application of the dual deposition angle is for the formation of the electrical lead layer. By depositing this layer at a larger angle from normal compared to the permanent magnet layers, the lead can be made to have direct contact with the sensor layer. This significantly decreases any contact resistance. The resultant structure formed from a dual deposition scheme in accordance with the invention is shown in FIG. 9. As shown in FIG. 9, a thicker permanent magnet underlayer 22 is formed farther into the abutted junction, by depositing underlayer 22 at a larger angle preferably about 35°–60° from normal than the permanent magnet material 20 (about 0°–20 from normal). The leads 30 are also deposited at a larger angle from normal than the permanent magnet 20 layer so as to encroach over the permanent magnet layer 20 and make contact with the sensor 10. The lead underlayer 32 can also be deposited at an angle so as to decrease its electrical resistivity as described above. A typical set of angles could be: permanent magnet underlayer=50°, permanent magnet overlayer 20=0°, lead underlayer 32=50°, lead overlayer 30=20°. Thus, the permanent magnet underlayer 22 angle>permanent magnet layer 20 angle, the lead 30 angle>permanent magnet layer 20 angle, and lead underlayer 22 angle>lead 30 angle.

In accordance with the invention, diffusion barriers can be made more effective at the edges by depositing the barrier layer at a larger angle than the layer above it. This makes the barrier layer extend farther than the layer above it and, thus, prevents diffusion at the edges of the layers. An example of this is Au and Cu for lead layers with Ta, TaN, TiN acting as diffusion barrier underlayers.

While a preferred embodiment of this invention has been illustrated and described, the invention is capable of modification and addition without departing from its basic principles. Accordingly, the invention is not intended to be limited to the exact embodiment illustrated. The scope of the invention is intended to be determined by reference to the claims and their equivalents in light of the prior art.

What is claimed is:

1. A method of forming a permanent magnet and electrical lead bilayer onto a sensor comprising the steps of:
   providing a substrate of sensor material;
   depositing a first layer of exchange bias material onto the substrate at a pressure lower than $1\times10^{-4}$ Torr; and
   depositing a second layer of electrical lead material over the first layer at a pressure greater than $1\times10^4$ Torr but less than about $3\times10^{-4}$ Torr to form a surface contact between the electrical lead material and sensor.

2. A method according to claim 1, wherein the exchange bias material is selected from the group consisting of FeMn, Ir, Mn, PtMn, NiMn, NiO and CoNiO.

3. A method according to claim 1 wherein the layer of electrical lead material is deposited at a pressure in the range of $1.5 \times 10^{-4}$ Torr to about $3 \times 10^{-4}$ Torr.

4. A method according to claim 1 wherein the exchange bias material is deposited at a pressure less then the pressure at which the electrical lead material is deposited.

5. A method according to claim 3 wherein the exchange bias material is deposited at a pressure less than the pressure at which the electrical lead material is deposited.

6. A method of forming a permanent magnet and electrical lead bilayer onto a sensor in an ion beam deposition comprising the steps of:

provisioning a substrate of sensor material;

depositing a layer of exchange bias material onto the substrate at a pressure lower than $1 \times 10^{-4}$ Torr; and depositing a layer of electrical lead material over the layer of exchange bias material at a pressure greater than $1 \times 10^{-4}$ Torr and less than about $3 \times 10^{-4}$ Torr whereby the electrical lead material extends to form a surface contact between the electrical lead and sensor.

7. A method according to claim 6 wherein the electrical lead material is deposited at a pressure greater than $1 \times 10^{-4}$ Torr.

8. A method according to claim 7 wherein the electrical lead material is deposited at a pressure in the range of $1.5 \times 10^{-4}$ Torr to about $3 \times 10^{-4}$ Torr.

9. The method of claim 6, wherein the pressure for the layer of electrical lead material is about $3 \times 10^{-4}$ Torr.

* * * * *